United States Patent [19]

Pannone et al.

[11] Patent Number: 4,765,751

[45] Date of Patent: Aug. 23, 1988

[54] TEMPERATURE AND PRESSURE PROBE

[75] Inventors: John L. Pannone, Glastonbury; Rocco M. Tommasini, Marlborough, both of Conn.

[73] Assignee: United Technologies Corporation, Hartford, Conn.

[21] Appl. No.: 67,748

[22] Filed: Jun. 29, 1987

[51] Int. Cl.[4] .................. G01F 1/46; G01K 13/02; G01K 1/14

[52] U.S. Cl. .................. 374/143; 73/861.66; 374/135; 374/144

[58] Field of Search .................. 374/143, 144, 135; 73/861.66

[56] References Cited

U.S. PATENT DOCUMENTS

| | | | |
|---|---|---|---|
| 2,756,596 | 7/1956 | Nelson | 374/144 |
| 3,343,417 | 9/1967 | Peek, Jr. | 374/143 |
| 3,348,414 | 10/1967 | Waters et al. | 374/144 X |
| 3,605,495 | 9/1971 | Krause et al. | 374/143 X |
| 4,131,756 | 12/1978 | Smith | 374/144 X |
| 4,433,584 | 2/1984 | Kokoszka et al. | 73/861.66 |
| 4,605,315 | 8/1986 | Kokoszka et al. | 374/144 |

Primary Examiner—Daniel M. Yasich
Attorney, Agent, or Firm—Stephen E. Revis

[57] ABSTRACT

A pressure and temperature measuring probe with a low drag, airfoil shaped cross section includes a longitudinally extending pressure cavity adjacent the leading edge and a separate longitudinally extending temperature cavity immediately downstream thereof. Longitudinally spaced apart passages extend downstream from their inlets at pressure measuring stations along the leading edge and intersect the pressure cavity. At temperature measuring stations along the leading edge passages extend downstream adjacent the pressure cavity to intersect the temperature cavity and direct a high velocity flow of gases over a thermocouple junction disposed within the temperature cavity. Stagnation devices at the leading edge reduce gas velocity to zero at the passage inlets.

12 Claims, 3 Drawing Sheets

TEMPERATURE AND PRESSURE PROBE

TECHNICAL FIELD

This invention relates to probes which simultaneously measure temperature and pressure of a moving gas stream.

BACKGROUND ART

Probes which simultaneously measure temperature and pressure of a gas stream are well known in the art and are particularly useful for gas turbine engine applications. One such probe is shown in commonly owned U.S. Pat. No. 3,343,417 to C. A. Peek, Jr. That probe includes a longitudinally extending body having a teardrop cross-sectional shape. Longitudinally spaced apart pressure taps or passages in the leading edge of the probe body intersect a longitudinally extending pressure measuring cavity. A separate longitudinally extending temperature measuring cavity is disposed within the probe body downstream of the pressure cavity. Longitudinally spaced apart inlets to the temperature cavity are located downstream of the pressure cavity near the trailing edge of the probe. Scoops adjacent the temperature cavity inlets direct the gas flow into the temperature cavity. A single outlet to the temperature cavity located at one end thereof has a thermocouple element disposed therein which reads the temperature of the gas at the cavity outlet.

To obtain an accurate and timely reading of the temperature of a gas at a particular location within a gas path it is desirable to have that gas flow over the thermocouple junction at near or greater than the same velocity at which it was flowing within the gas path; and the junction should be as close as possible to the point within the gas path at which the temperature is to be measured. Otherwise, the temperature which is being measured may not accurately reflect the temperature of the gas at the gas path location of interest; and it may not be the temperature at the time of interest. In the Peek, Jr. patent described above there is necessarily a time delay for the gases to reach the sole thermocouple junction; also the gases may change temperature as they travel from the probe inlet to the thermocouple junction. Pressure gradients on the external surface of the probe body just upstream of the temperature cavity inlets may also affect the flow velocities entering the temperature cavity. Stagnant or low velocity air within the cavity and which entered the probe at one moment of time may become mixed with gases entering the probe at a different moment of time, such that the temperature reading may be less accurate and less indicative of the temperature in the free gas stream at the moment of temperature reading.

Commonly owned U.S. Pat. No. 4,605,315 describes a temperature probe which is a part of a gas turbine engine strut. In that patent a scarfed tube at the strut leading edge provides a fixed stagnation point at the throat of the probe inlet. The inlet and outlet dimensions are predicated on having the velocity of the gas flow over the thermocouple junction within the temperature cavity bear a relationship to the free-stream velocity of the gas. Note, also, the prior art shown in FIG. 1 of U.S. Pat. No. 4,605,315. In that figure a small tube having an inlet at the leading edge 12 of the probe directs fluid over a thermocouple 14. The tube passes directly through an unnumbered cavity which is only shown in cross section in FIG. 1. That cavity is a longitudinally extending pressure cavity analogous to the pressure cavity 33 of U.S. Pat. No. 3,343,417. Pressure taps (not shown) at longitudinal locations different from the locations at which temperature readings are taken intersect that cavity. The tubes passing through the pressure cavity are undesirable since they adversely affect the pressure readings within the pressure cavity.

Another patent which shows a pressure probe within the leading edge of a strut is commonly owned U.S. Pat. No. 4,433,584 to Kokoszka et al. Other patents showing the state of the art of instrumentation probes of either the pressure or temperature sensing type are U.S. Pat. Nos. 2,414,370; 2,571,422; 2,971,997; 3,000,213; 3,075,387; 3,348,414; 3,451,862; 3,497,398; 3,605,495 (combination pressure and temperature probe); and 4,244,222.

DISCLOSURE OF INVENTION

One object of the present invention is a combined pressure and temperature probe which has a quick response time and a high degree of accuracy.

Another object of the present invention is a combined pressure and temperature probe which may be disposed within a relatively thin longitudinally extending body having a streamlined crosss-sectional shape.

Yet another object of the present invention is a combined temperature and pressure probe which may be constructed to measure both temperature and pressure at essentially the same location along the longitudinal length of the probe.

Accordingly, a longitudinally extending temperature and pressure probe has a streamlined cross-sectional shape, a longitudinally extending pressure cavity adjacent its leading edge which is intersected by a passage having its inlet at the leading edge, a temperature cavity disposed downstream of and separate from the pressure cavity including an outlet therefrom, a gas carrying passage having an inlet at the leading edge extending downstream adjacent the pressure cavity and intersecting the temperature cavity to direct a flow of gas over a thermocouple junction within the cavity and aligned with the passage outlet, and means for causing the gas to flow within the passage and over the thermocouple junction at a high velocity.

The probe of this invention is able to measure both temperature and pressure of a moving gas at the leading edge of the probe body without either function interfering with or reducing the accuracy of the other. There are no tubes passing through the pressure cavity; and the temperature of the gas flowing over the thermocouple is reliable indicative of the actual temperature of the gas immediately upstream of the probe at the time the temperature is being measured.

Another advantage of the present invention is that the probe can be packaged as a relatively thin airfoil shaped strut which has a low drag coefficient and minimal frontal area. This combination results in a low drag force and, in a gas turbine engine application, lower performance losses.

Yet another advantage of the present invention is that both pressure and temperature readings may be made at substantially the same longitudinal location along the leading edge of the probe, if desired.

In a preferred embodiment the pressure cavity is centered on the center chord of the airfoil shaped probe cross-section, and the gas sample for the temperature cavity is carried within a pair of passages disposed adjacent each side of the pressure cavity. These passages each have separate inlets at the leading edge and they merge with each other downstream of the pressure cavity to form a single passage which communicates with the temperature cavity. The thermocouple junctions within the temperature cavity are aligned with and close to such passage outlet.

Preferably a stagnation tube surrounds the inlet to the passage carrying fluid to the thermocouple junction to stagnate the gas stream at the inlet. The passage outlet into the cavity is sized, relative to the temperature cavity outlet, such that the cavity pressure is substantially the same as the free-stream pressure, whereby the pressure drop across the passageway results in a gas velocity therethrough and over the thermocouple junction which is about the same as the free-stream velocity. Thus, the thermocouple temperature reading is close to the actual temperature of the gas stream at the leading edge of the probe at the time the reading is taken; and there is less likelihood of gas previously received into the cavity affecting the readout.

The foregoing and other objects, features and advantages of the present invention will become more apparent in the light of the following detailed description of preferred embodiments thereof as illustrated in the accompanying drawing.

BEST MODE FOR CARRYING OUT THE INVENTION

Figure 1:
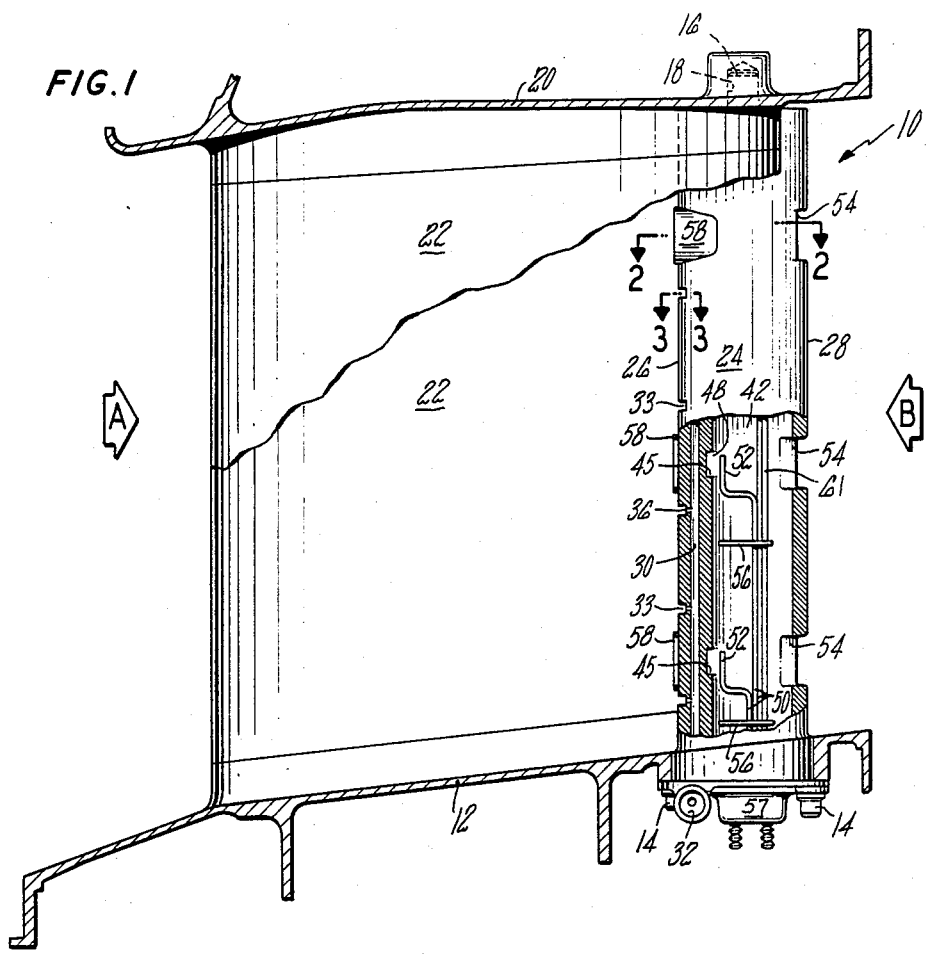
FIG. 1 is a partial view, in section and partly broken away, illustrating the temperature-pressure probe of the invention disposed between a pair of engine exhaust struts.

This invention is currently being utilized on the PW4000 engine manufactured by United Technologies Corporation's Pratt & Whitney Division. In the exemplary embodiment depicted in FIG. 1, the temperature-pressure probe of the present invention is generally represented by the reference numeral 10. The probe 10 is secured to the engine outer exhaust case 12 by three bolts 14, only two of which are shown in the drawing. The radially innermost end of the probe 10 is located by a cylindrical pin 16 which fits within a corresponding cylindrical hole 18 in the engine inner exhaust case 20. In this particular application the engine has 15 turbine exhaust struts 22 circumferentially disposed and spaced apart about the engine axis (not shown). Each probe 10 is disposed between a pair of adjacent struts 22 for measuring the pressure and temperature of the air flowing downstream, which is from left to right in FIG. 1. In the PW4000 engine there are four probes 10 circumferentially spaced apart at an axial station near the trailing edge of the struts 22. The number, axial location, and circumferential location of the probes is not considered to be a part of the present invention.

Figure 2:
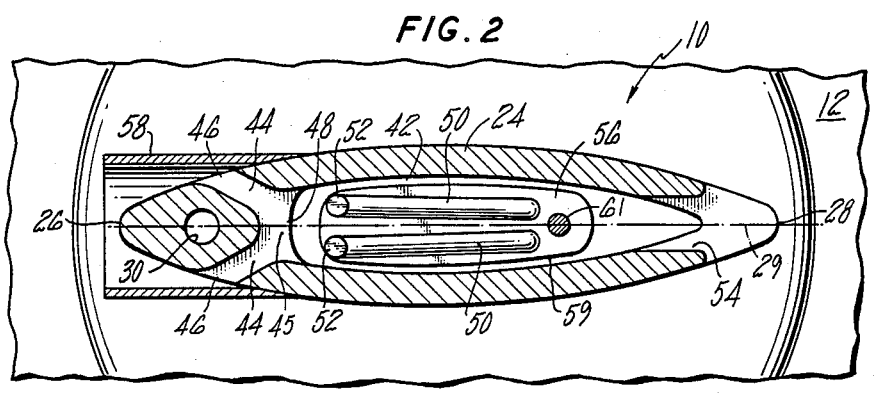
FIG. 2 is a sectional view of the temperature-pressure probe of the present invention taken along the line 2—2 of FIG. 1.
Figure 3:
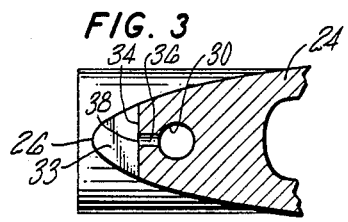
FIG. 3 is a sectional view of the temperature-pressure probe of the present invention taken along the line 3—3 of FIG. 1.
Figure 4:
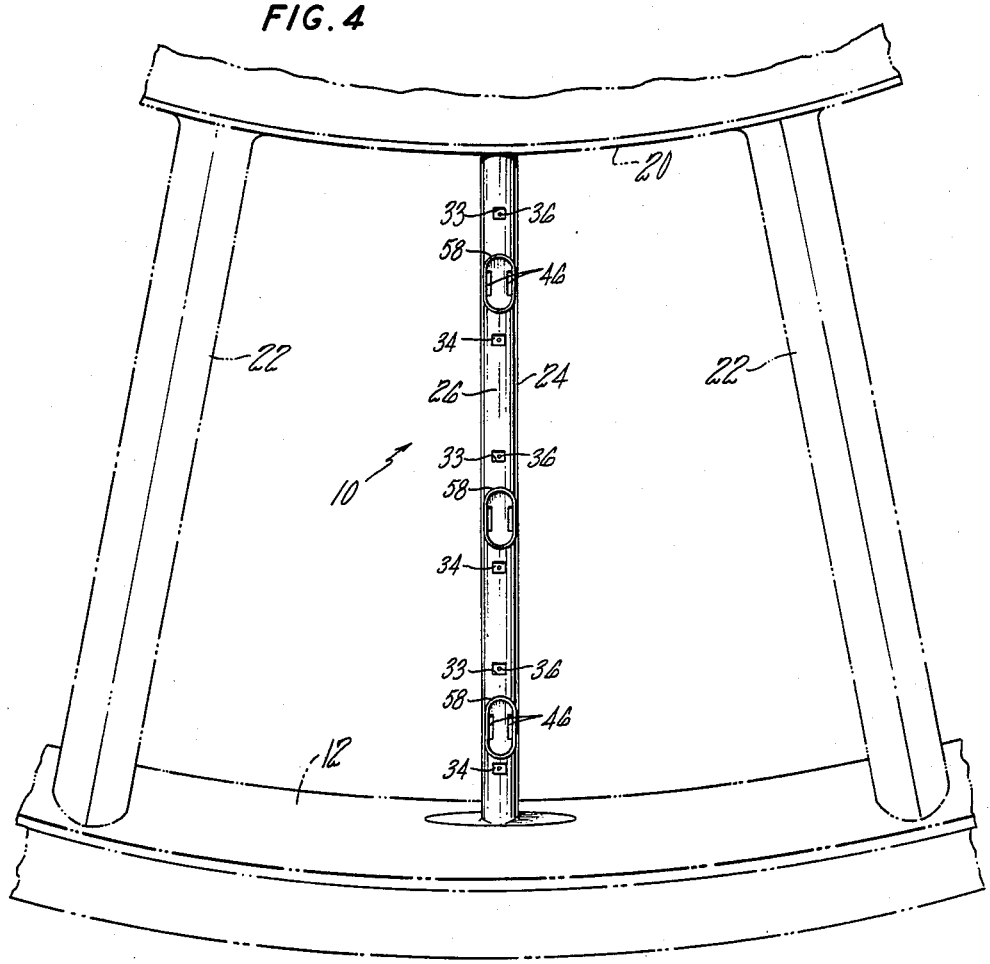
FIG. 4 is a view taken in the direction of the arrow A of FIG. 1, which is a view looking aft.
Figure 5:
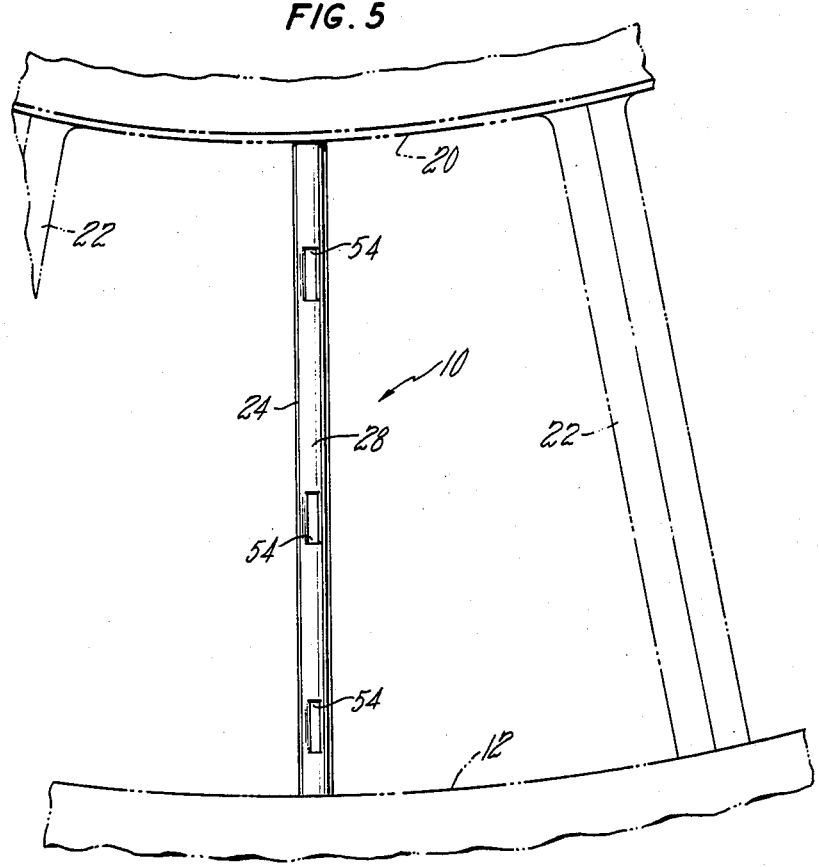
FIG. 5 is a view taken in the direction B of FIG. 1, which is a view looking forward.

With reference to FIGS. 1–3, the probe 10 of this exemplary embodiment comprises a body 24 which has a streamlined, airfoil shaped cross section including a leading edge 26 and a trailing edge 28. The probe body cross sectional shape in this embodiment is symmetrical about an axis 29. Immediately downstream of and adjacent the leading edge 26 is a cylindrical cavity 30 which extends longitudinally across the radial extent of the gas path from the outermost to the innermost end of the probe. The radially outer end of the cavity 30 communicates with a pressure sensing fitting 32 which is secured to the probe body 24. The radially inner end of the cavity 30 is dead ended.

In this embodiment the pressure cavity 30 is used to measure average total pressure across substantially the entire radial extent of the gas flow path. A plurality of longitudinally (i.e., radially) spaced apart notches 33 are cut through the leading edge transverse to the radial direction to form flat, upstream facing stagnation surfaces 34 at each location where the pressure is to be sampled. A drilled passageway 36 at the location of each surface 34 has its inlet 38 at the surface 34, which is essentially at the leading edge of the probe body. The passageway 36 extends downstream to intersect the pressure cavity 30. The flat surface 34 assures that the gaseous fluid within the flow path is brought to substantially zero velocity at each inlet 38 such that the total pressure reading is substantially uninfluenced by the airfoil induced pressure variations adjacent the external walls of the probe. The flat surface 34 permits accurate readings for gas incidence angles of plus or minus about five degrees (5°) from the axis 29 of the probe body.

Turning now to the temperature measuring aspects of the probe 10, the probe body 24 includes a temperature cavity 42 which extends longitudinally over substantially the full length of the probe body 24 and is closed at the radially innermost end of the probe. At each station (three in this embodiment) along the probe length where it is desired to measure the temperature of the gas stream the probe body includes a downstream extending passageway 45 having a pair of legs 44. Each leg 44 is longitudinally elongated in cross section, as can be seen at its inlet 46 at the leading edge 26. The legs extend downstream adjacent each transverse side of the pressure cavity 30 and merge together immediately downstream thereof to form common portion of the passageway 45 which intersects the temperature cavity 42 to define an outlet 48 for the passageway.

Disposed within the temperature cavity 40 are a plurality of thermocouple wires 50. The thermocouple wires 50 connect with terminals (not shown) within a junction box 57 which is secured to the probe body 24 by the bolts 14. The wires 50 include a pair of side by side thermocouple junctions 52 aligned downstream of and positioned closely adjacent each outlet 48 (see FIG. 2). The thermocouple wires 50 pass through baffle plates 56 which are disposed within the cavity 42 between adjacent temperature measuring stations. In this embodiment the plates 56 are secured to the thermocouple wires 50 and are spaced around their edges 59 from the internal wall of the cavity 42. The plates 56 divide the cavity 42 into portions, each containing its own thermocouple junction. The plates reduce (but do not completely eliminate) gas flow between cavity portions, which improves the accuracy of the readings at each junction location. The plates also provide lateral constraint for the bundle of thermocouple wires and dampen vibration. A single support rod 61 extends longitudinally through the plates 56 to provide additional structural rigidity to the wires.

A stagnation tube 58 is secured, such as by welding, to the leading edge of the probe body 24 at each location where temperature is to be measured. The stagnation tubes 58 capture the flow and develop total pressure (i.e., reduce the velocity to substantially zero) at the inlets 46 to the passageway legs 44 before the velocities are affected by flow around the surface of the airfoil shaped body.

In operation the portion of the gas stream flowing through each passageway 45 is directed over the thermocouple junction 52 aligned therewith. The gaseous fluid entering the cavity 42 exits through longitudinally elongated outlet slots 54 through the trailing edge 28 of the probe body 24. Each slot 54 is substantially axially aligned with an outlet 48, although alignment is not critical. The area of each outlet 54 is sufficiently larger than the area of the passageway outlet 48 aligned therewith to avoid any pressure drop within the temperature cavity such that the pressure in the cavity 42 is substantially the free-stream static pressure. The object is to size the inlets 46, outlets 48, and outlets 54 to assure that the velocity of flow through the legs 44 and over each thermocouple junction 52 is not much less than the free-stream velocity of the gas near the inlets 46, or even somewhat greater. This assures that the temperature being read at each thermocouple junction 52 is as close as possible to the temperature of the gas at the probe leading edge at the time the reading is taken. The high velocity of the gas entering the cavity 42, the close proximity of the thermocouple junction 52 to the outlet 48, and the lack of a pressure drop within the cavity 42, as well as the baffle plates 56, further assure that the temperature being read at a thermocouple junction 52 is the temperature of the gas impinging upon it from a passageway 45, and is not stagnant or slow moving gas within the cavity 42 which entered the cavity at some earlier time or from some other location.

The compact design of the present invention is particularly useful where probes of low profile are desired to minimize losses within the gas stream being measured. The invention is most beneficial for thin, low drag probes where the probe width cannot exceed about 0.6 inch and the length to width aspect ratio is greater than about 4.0. Prior art probes for measuring both pressure and temperature cannot meet these criteria. In the embodiment described above, which is used in the PW4000 engine, the airfoil chord length, which is the same as its axial length, was about 1.9 inches; and its maximum width was about 0.44 inch, for a length (chord length) to width aspect ratio of 4.3.

The ratio of the area of the outlet 54 of a passageway 45 to the area of the outlet 48 of the cavity 42 was 1.5:1. Using the diameter "d" of the thermocouple junction wire as a base unit of measurement, the longitudinal length of each inlet 46 was 6.0 d and the transverse width was 1.3 d, making the total inlet cross sectional area at each station (two inlets per station) 15.6 $d^2$. The longitudinal length of each outlet 48 was 11.5 d and the transverse width of each outlet 48 was 2.6 d, making the outlet area 29.9 $d^2$. The central axis of each thermocouple junction wire was disposed a distance 2.5 d downstream of its associated outlet 48. In this embodiment d was 0.062 in., the cavity 30 was 0.108 inch in diameter, and the passageway 36 was 0.035 inch in diameter.

Figure 6:
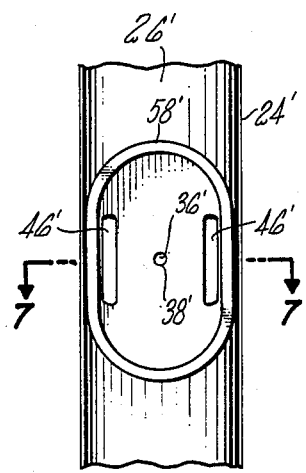
FIG. 6 is a view similar to the view of FIG. 4 but showing a temperature-pressure probe according to an alternate embodiment of the present invention.
Figure 7:
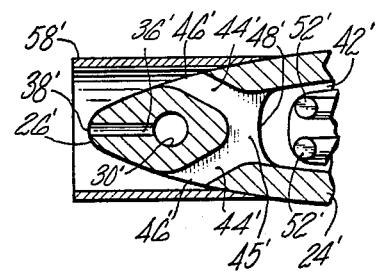
FIG. 7 a sectional view taken along the line 7—7 of FIG. 6.

FIGS. 6 and 7 represent an alternate embodiment of the present invention. The same reference numerals as used with the foregoing embodiment are used to designate analogous elements and features of this alternate embodiment, except the reference numerals have been primed. FIG. 6 is a front view of the probe looking aft (a view analogous to the view shown in FIG. 4 for the previous embodiment); and FIG. 7 is a sectional view taken along the, line 7—7 of FIG. 6. The only differences between this alternate embodiment and the embodiment of FIGS. 1–5 are that pressure is measured at only one location, and the passageway 36' leading to the pressure cavity 30' is at the same longitudinal location as the passageway legs 44'. Thus, the pressure and temperature are measured at the same longitudinal location at the leading edge 26'. In this embodiment the flat stagnation surface 34 of FIG. 3 surrounding the inlet 38 to each passageway 36 is unnecessary (and has been eliminated) since the tube 58' stagnates the gas stream for purposes of both the pressure and temperature measurements.

Although the invention has been shown and described with respect to a preferred embodiment thereof, it should be understood by those skilled in the art that other various changes and omissions in the form and detail of the invention may be made without departing from the spirit and scope thereof.

We claim:

1. A temperature and pressure probe for measuring the temperature and pressure of a gaseous stream flowing in a downstream direction, comprising:

a probe body adapted to be disposed in said gas stream and having a streamlined shape in cross section perpendicular to its length, its length being the longitudinal direction, said probe also having a longitudinally extending leading edge adapted to face upstream, and a longitudinally extending trailing edge adapted to face downstream, said probe body including a longitudinally extending first cavity therewithin adjacent said leading edge, and a second cavity formed within said probe body separate from and downstream of said first cavity, said probe body including means defining an outlet from said second cavity;

downstream extending first passage means within said probe body, having an inlet at said leading edge and intersecting said first cavity to define an outlet of said first passage means, wherein one end of said first cavity is adapted to communicate with means for sensing the pressure within said first cavity;

second downstream extending passage means within said probe body adjacent and separate from said first cavity and having an inlet at said leading edge and intersecting said second cavity to form an outlet of said second passage means;

means for reducing the free-stream velocity of said gaseous stream to substantially zero at said first and second passage means inlets; and temperature measuring means including a thermocouple junction disposed within said second cavity and aligned in the downstream direction with said second passage means outlet for receiving a flow of gaseous fluid over said junction from said second passage means.

2. The temperature and pressure probe according to claim 1, wherein said second passage means outlet and second cavity outlet are sized relative to each other to result in a gas velocity over said thermocouple junction of at least, approximately, the gas free-stream velocity.

3. The temperature and pressure probe according to claim 2, wherein said means for reducing the free-stream velocity includes a stagnation tube integral with said leading edge surrounding said second passage means inlet.

4. The temperature and pressure probe according to claim 3, including a plurality of said first passage means longitudinally spaced apart along said leading edge and a plurality of said second passage means longitudinally spaced apart along said leading edge.

5. The temperature and pressure probe according to claim 1, wherein said first passage means inlet and said second passage means inlet are located at substantially the same longitudinal station along said leading edge.

6. The temperature and pressure probe according to claim 5, wherein said means for reducing the free-stream velocity includes a stagnation tube integral with said leading edge surrounding said first and second passage means inlet.

7. The temperature and pressure probe according to claim 6, wherein said first and second legs of said second passage means are longitudinally elongated in cross section.

8. The temperature and pressure probe according to claim 1, wherein said second passage means includes a first leg and a second leg disposed on opposite transverse sides of and adjacent said first cavity for carrying said gaseous fluid around said first cavity to said second cavity.

9. The temperature and pressure probe according to claim 8, wherein said means for reducing the free-stream velocity includes a stagnation tube integral with said leading edge surrounding said second passage means inlet.

10. The temperature and pressure probe according to claim 9, including baffle means disposed within said second cavity dividing said cavity into a plurality of portions, each portion including one of said thermocouple junctions, wherein said baffle means are constructed and arranged to reduce gas flow between portions.

11. The temperature and pressure probe according to claim 8, wherein said streamlined cross sectional shape has a maximum width of 0.6 inch and a length to width aspect ratio of at least 4.0.

12. The temperature and pressure probe according to claim 8, wherein said first and second legs of said second passage means are longitudinally elongated in cross section.

* * * * *